(12) United States Patent
Dasberg et al.

(10) Patent No.: US 12,387,074 B2
(45) Date of Patent: Aug. 12, 2025

(54) THERMAL MARKING FOR OBJECT TRACKING

(71) Applicant: Aptiv Technologies AG, Schaffhausen (CH)

(72) Inventors: Friedrich Dasberg, Schaffhausen (CH); Lutz Roese-Koerner, Schaffhausen (CH); Nils Freitag, Schaffhausen (CH); Martin Alsfasser, Schaffhausen (CH); Maurice Riediger, Schaffhausen (CH); Elisabeth Muhlhausen, Schaffhausen (CH)

(73) Assignee: Aptiv Technologies AG, Schaffhausen (CH)

( * ) Notice: Subject to any disclaimer, the term of this patent is extended or adjusted under 35 U.S.C. 154(b) by 10 days.

(21) Appl. No.: 18/428,616

(22) Filed: Jan. 31, 2024

(65) Prior Publication Data
US 2025/0232144 A1 Jul. 17, 2025

(30) Foreign Application Priority Data

Jan. 17, 2024 (EP) .................................... 24152473

(51) Int. Cl.
*G06K 15/02* (2006.01)
(52) U.S. Cl.
CPC .................................. *G06K 15/028* (2013.01)
(58) Field of Classification Search
CPC ....................................................... G06K 15/028
USPC ........................................................... 235/491
See application file for complete search history.

(56) References Cited

U.S. PATENT DOCUMENTS

| 5,682,331 A | 10/1997 | Berlin |
| 2012/0284277 A1* | 11/2012 | Kinoshita .............. G06Q 10/08 707/741 |
| 2021/0025761 A1* | 1/2021 | Altenbeck ............... H10F 99/00 |
| 2021/0241190 A1* | 8/2021 | Janik ...................... G06N 20/00 |
| 2023/0007021 A1* | 1/2023 | Christian ................ H04W 4/80 |

FOREIGN PATENT DOCUMENTS

CN 116721134 A 9/2023

OTHER PUBLICATIONS

Extended European Search Report for EP24152473 dated Jun. 26, 2024, 28 pages.

* cited by examiner

*Primary Examiner* — Allyson N Trail
(74) *Attorney, Agent, or Firm* — Miller Johnson

(57) ABSTRACT

Disclosed is a method of recording tracking information on an object, for tracking a progress of the object through a manufacturing process. The method includes obtaining one or more temperature specifications associated with the manufacturing process. The method includes applying a thermal signature to the object representing the tracking information. The thermal signature includes one or more coverage areas having a temperature that is greater than the one or more temperature specifications associated with the manufacturing process.

11 Claims, 3 Drawing Sheets

THERMAL MARKING FOR OBJECT TRACKING

CROSS-REFERENCE TO RELATED APPLICATIONS

This application claims priority to EP 24 152 473 filed Jan. 17, 2024, the entire disclosure of which is incorporated by reference.

FIELD

The present disclosure relates to thermal marking of objects, and more particularly to the use of thermal signatures in tracking information of an object along a manufacturing process.

BACKGROUND

In a manufacturing environment, parts may travel large distances at high speeds through particular process pathways. It is important to be able to track the position of parts as they progress through such pathways, and to be able to classify the status of each specific part as part of a quality control procedure, in order to verify that a manufacturing process is being performed correctly.

Labelling of parts to enable their tracking through a manufacturing process can be performed via simple mechanisms such as marking by colors, stamps or engravings, but such techniques typically involve making physical alterations to a part, which may remain perceptible to a customer or user after the manufacturing process is complete. Further, there may be a requirement for the nature of such physical alterations to be communicated to customers or users in product specification reports, particularly if the structure or behavior of the product is to be correctly validated in a post-production process. This adds to the complexity of the production process.

There is a need to be able to track parts through a process in a manner which does not require changing the properties or appearance of the part to enable it to be tracked.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect, there is provided a method of recording tracking information on an object, for tracking the progress of the object through a manufacturing process comprising obtaining one or more temperature specifications associated with the manufacturing process, and applying a thermal signature to the object representing the tracking information, the thermal signature comprising one or more coverage areas having a temperature which is greater than the one or more temperature specifications associated with the manufacturing process.

In this way, a non-destructive scheme for marking objects is provided, so enable their traceability while not changing their appearance or properties. Thermal signatures can be readily applied using any of a number of techniques, such that the product-marking scheme can be readily configured or retrofitted for use with existing product manufacturing processes.

In embodiments, the temperature of the thermal signature is greater than the maximum temperature specification of the manufacturing process by at least a predetermined delta temperature. In this way, it can be ensured that there is a margin between maximum temperature that an object is likely to reach during the manufacturing process, and the thermal signature, such that the thermal signature can be clearly isolated from unmarked regions of the object throughout the object's movement through a process pathway, even in the event of deviations in the object's temperature from an expected profile.

In embodiments, the temperature of the thermal signature has a temperature gradient such that it exceeds the maximum temperature specification of the manufacturing process for a time period, following application of the thermal signature, within which the manufacturing process is to be completed. In this way, traceability of an object through the full duration of a manufacturing process is ensured by use of a thermal signature which remains detectable despite active cooling associated with parts of the manufacturing process, or heat dissipation occurring as the object progresses through the process pathway.

In embodiments, applying the thermal signature comprises applying heating each of one or more surfaces of the object using a direct contact, or contactless, heat source. In embodiments, the heat source is selected in accordance with at least one of geometry and heat absorption characteristics of the object and/or the information to be recorded. In this way, optimum heating of the product is achieved which avoids product damage and maximizes detection of the thermal signature, while avoiding excessive heating.

In embodiments, the heat source is a laser having a wavelength selected in dependence upon a wavelength-absorption profile for the object. This optimizes efficiency of heating of the product, for a given heating power, while enabling high-resolution thermal signatures to be generated.

In embodiments, the recorded information includes object identification information. In this way, it is possible to track the progress of an individual product, or group of products through a pathway in order to support analysis of the performance and efficiency of the manufacturing process.

In embodiments, the object identification information is a binary string, wherein each of a plurality of locations on the object is associated with a digit of the binary string, and a coverage area of the thermal signature located at one of the plurality of locations on the object represents a respective digit of the binary string having one of the binary states. In this manner, detailed tracking information can be easily encoded on a product using a flexible technique.

In embodiments, the object is an automotive part, and the manufacturing process is an automotive manufacturing process.

According to a second aspect, there is provided a method of tracking an object travelling through a manufacturing process pathway, comprising thermally imaging, at one or more positions along the manufacturing process pathway, a thermal signature located on the object to identify one or more areas of the object having a temperature greater than a threshold temperature, determining object information based on the identified one or more areas, and recording the progress, along the manufacturing process pathway, of the object having the determined object identification.

According to a third aspect, there is provided a manufacturing process comprising recording tracking information on an object according to the method of the first aspect, tracking the object according to the method of the second aspect, and recording a classification of the status of the object.

For each type of thermal signature, there is no change to the shape, appearance, or structural properties of an object which is to be marked, and the thermal signature is temporary in nature. As such, the manufacturing process which provides the context of the thermal making scheme is not compromised in any way, in terms of the nature of the products which are produced, or the process by which they are produced.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Illustrative embodiments will now be described with reference to the drawings in which.

In the drawings, reference numbers may be reused to identify similar and/or identical elements.

DETAILED DESCRIPTION

Figure 1:
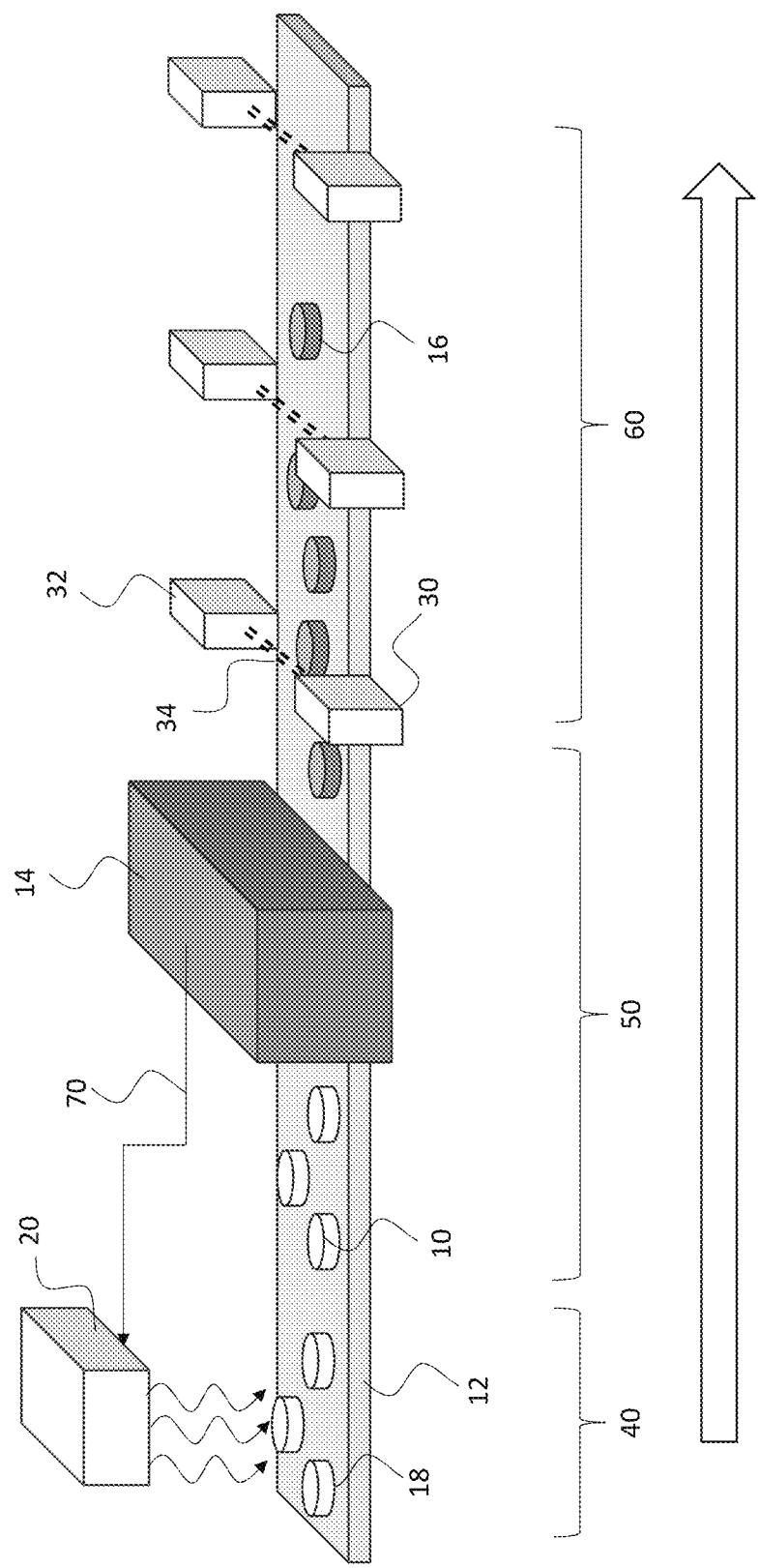
FIG. 1 shows a simplified representation of a manufacturing process in the context of which embodiments of the present invention are described.

A first embodiment of the present disclosure is described in relation to a manufacturing process represented in FIG. 1, in which circular discs are transported through a spray-painting system to be colored with paint. As is clear from the remaining disclosure, the first embodiment is applicable to any manufacturing process applied to any product, and the spray-painting of discs is an example selected for simplicity of description.

In the configuration illustrated in FIG. 1, a plurality of unpainted discs 10 travel, on a conveyor belt 12, through a spray-painting system 14. Painted discs 16 are transported away from the spray-painting system 14 to the output of the process, or the input of a subsequent process.

It is desired to be able to track one, several, or each individual disc 10 passing through the spray-painting system 14, in order to verify that the disc 10 has not become stuck to an object or surface in the spray-painting system 14, or in a mechanism of the conveyor belt 12. Tracking one or more discs 10 in this way also enables information to be gathered relating to the speed of progression of the manufacturing process as a whole, and the distribution of discs throughout the process. The distribution, in spatial and temporal terms, is referred to herein as progression through a process pathway, and tracking progress through a process pathway enables to the pathway to be controlled or modified to avoid bottlenecks and regulate the flow of objects along the pathway.

Figure 2:
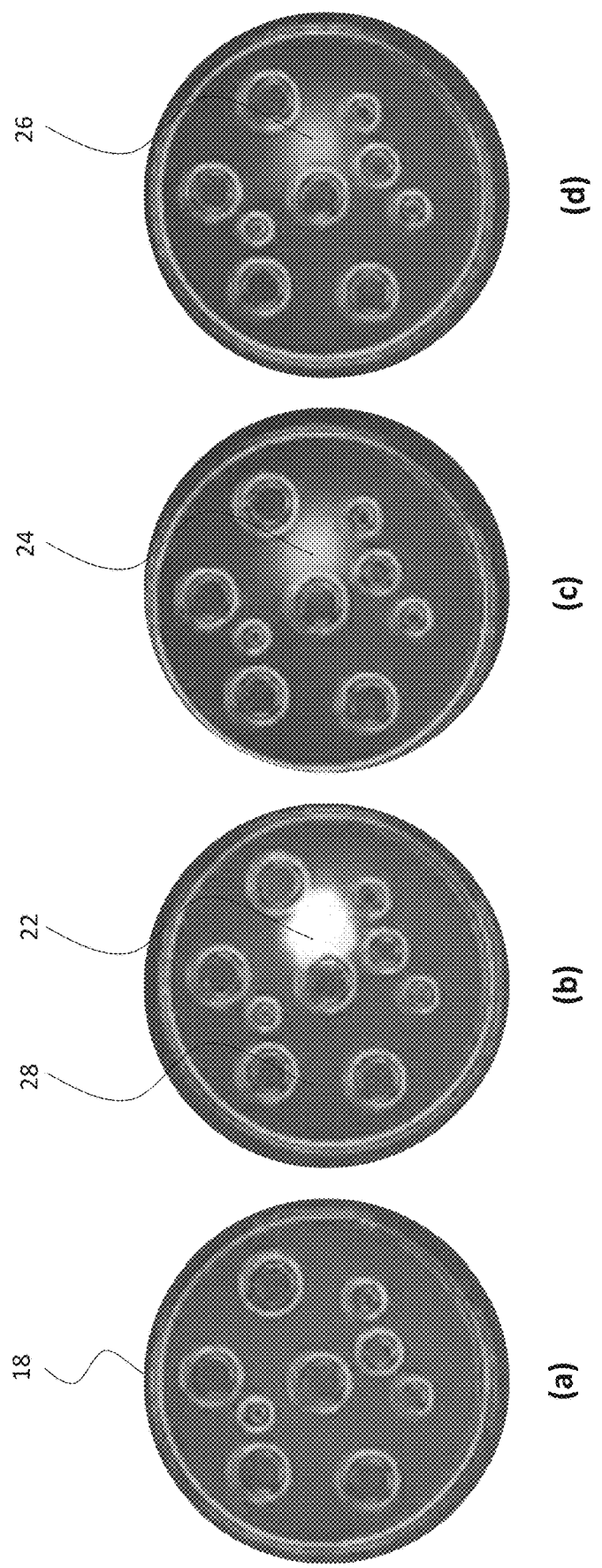
FIG. 2 shows thermal images of an object having a thermal signature produced according to a first embodiment.

In the first embodiment, a thermal signature is applied to a disc 18 to be tracked. The thermal signature is illustrated in the thermal image of FIG. 2 and is a region of the disc 18 which is heated by a heat source 20, so that it has a temperature which is higher than the remainder of the disc 18. The region is referred to herein as a coverage area of the thermal signature. In the first embodiment, the thermal signature has a single coverage area which is approximately circular but does not have any specific shape.

In the first embodiment, the coverage area is identified as a region 22 having a temperature of approximately 10-15 K greater than the remainder of the disc. The evolution of the thermal signature with time, referred to herein as the 'thermal gradient', is shown in FIG. 2(a) (no coverage area prior to the application of the thermal signature), FIG. 2(b) (a coverage area 22 at the time at which the thermal signature is applied by the heat source 20, referred to herein as T=0), FIG. 2(c) (a cooler coverage area 24 ten seconds after application of the thermal signature), and FIG. 2(d) (a yet cooler coverage area 25 fifteen seconds after application of the thermal signature). It is seen that although the thermal signature cools after its application, it can still be identified after fifteen seconds through its distinction from the background temperature of regions 28 of the disc 18 which have no thermal signature.

The discs are formed of silicone in the first embodiment, and the thermal signature is applied using a contactless source of heat, such as any light or other heat radiating source. The thermal signature is applied at the start of the process pathway, which corresponds either to a position at the start of the conveyor belt, as illustrated in FIG. 1, or in a preliminary process from which marked discs 10 are provided to the conveyor belt 12 to start the painting process.

Along the process pathway are one or more thermal detectors 30, 32 which perform thermal imaging of objects travelling through the detector. For convenience of illustration, FIG. 1 shows pairs of detectors 30, 32, with a thermal detection region 34 arranged therebetween, although it will be appreciated that single detectors may be distributed along the conveyor belt 12, rather than pairs.

For simplicity of explanation, the detectors are shown downstream of the spray-painting process. This enables the pathway to be represented in FIG. 1 in terms of discrete stages comprising (a) a thermal marking stage 40, (b) a manufacturing process stage 50, and (c) a signature detection stage 60. It will of course be appreciated that stages (b) and (c) may overlap in temporal and spatial configuration.

In the first embodiment, each detector 30, 32 is able to track the number of objects passing through the detection region 34 in a detection window, from which capacity and throughput of the process is monitored. The number of objects is determined by counting the number of thermal signatures which are identified, by comparing the temperature of detected objects with a threshold detection temperature and identifying the number of events in which the threshold is exceeded. The output of the thermal detectors 30, 32 is provided to a control system (not shown), with which process diagnostic or adjustment can be determined, instructed, or controlled.

In the case of thermally marking a disc, one or both surfaces of the disc may be marked so that if the disc flips over during the manufacturing process, the thermal signature remains visible to the detector.

Figure 3:
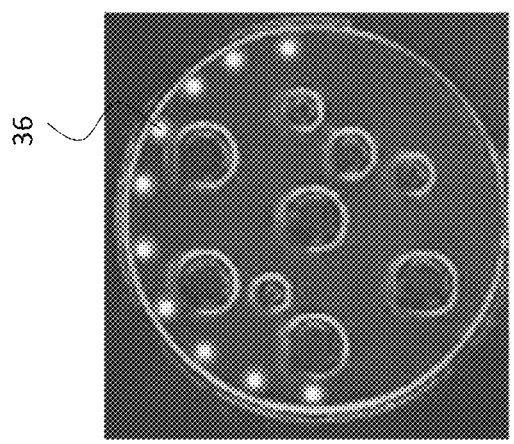
FIG. 3 shows a thermal image of an object having a thermal signature produced according to a second embodiment.

FIG. 3 shows an example of a more detailed thermal signature which is applied to a disc in a second embodiment, in the context of the manufacturing process described with reference to FIG. 1. The thermal signature has a plurality of coverage areas 36, shown as ten dots spaced around a portion of the edge of the disc. The coverage areas are significantly smaller than the coverage area shown in FIG. 2, but have similar thermal gradients as that shown in FIG. 2.

A more detailed thermal signature allows richer information to be recorded on an object and identified by the detectors than the binary presence or absence of a coverage area. The thermal signature of the second embodiment has a predetermined pattern, to be identified by the detector. The pattern in this instance can be a ten-bit binary string in which coverage areas are either heated, or not heated, to represent one of two thermal states. From thermal detection of such a binary string, it is possible to identify a unique disc identification (ID), or tracking information or code, in the case in which each disc is marked with a different thermal signature.

This process allows finer monitoring of the performance and efficiency of the manufacturing process, and is particularly suitable for cases in which products to pass through the process are of different size, thickness, material, or differ in some other way, such that per-product tracking provides useful information. Even in the case in which all products are the same as each other, per-product tracking is useful where there is a need to classify which particular products have followed one or more branches of the process pathway to travel to different manufacturing stages, for instance where process information needs to be recorded for supply with and verification of a manufactured product.

It will be appreciated that a configuration can also be applied, in which groups of products are tracked according to an ID associated with each group, rather than assigning a unique ID to each product. The groups can be defined by product type, batch number, date, and so on.

In the example of FIG. 3, ten dots are shown, but some of the ten dots could be omitted to represent a binary low state for a corresponding position in the string. As such, the product-marking scheme is flexible and easy to control.

For a higher-resolution thermal signature such as that of FIG. 3 (in comparison to the lower-resolution thermal signature of FIG. 2), a more precise heat source, such as a laser, is used. The specific material of the product affects the extent to which particular wavelengths of laser light are absorbed, and so a laser is selected having a wavelength which is at or close to a maximum or high level of absorption of the product's wavelength-absorption profile to maximize efficiency of generation of the signature.

Objects to be tracked may have a variety of different regular and irregular three-dimensional shapes. A particular example of an object type for use in embodiments of the disclosure is an automotive part, being formed, or installed in a particular processing phase of an automotive manufacturing process.

One or more surfaces of such shapes may be particularly appropriate for thermal marking, for example if they are substantially flat, as this enhances compatibility with direct contact heat sources, which may be employed in embodiments. Direct contact heat sources include contact with a heated transportation belt, a heated roller, a stamp and other suitable means. Thermal marking of each surface may enable the orientation of a product to be identified by tracing a product's configuration from the relative positions of a plurality of different thermal signatures, and the signatures may be marked such that they identify specific surfaces (such as 'top', 'side' and so on).

In embodiments in which such a complex level of tracking is not required, it is more efficient to apply a thermal signature to only a selection of one or more surfaces, such as opposite surfaces of a cube-shaped product, with the selection is optimized to minimize the possibility that a thermal signature will be missed by a detector, but to avoid duplication of recording of information or excessive heating of the products.

More generally, the optimum heat source(s) to be used to thermally mark a particular product depend on properties of the product itself, such as the size, geometry, material, in addition to the required thermal gradient and coverage area(s) of the thermal signature for tracking through a particular pathway. In this way, a heat source can be selected which enables the required temperature of a coverage area to be achieved without deforming the product, maximizing the possibility of detection of the thermal signature, and without unnecessary waste of heating resources.

In embodiments based on FIG. 3, having detailed information, any number of suitable marking schemes can be employed, based on the number of coverage areas, their spacing, their positioning with respect to the product as a whole, and the presence or nature of any scheme to enable the detector to identify the position of the thermal signature before extraction of information from the thermal signature itself. Such a positioning scheme may involve a pair of coverage areas at the start and end of the pattern, acting as 'header' and 'footer' markers for recorded disc information represented by a 'payload' of coverage areas between the markers. In embodiments, it may not be necessary to use any header or footer markers, particularly where substantial re-orientation of an object along a pathway is anticipated, such that a detector can be pre-aligned with the expected position of a thermal signature. Instead of a binary string, the coverage areas may be arranged to represent a particular two-dimensional image or pattern.

As above, it is possible to generate a number of different types of thermal signature, dependent upon the context in which the thermal marking scheme is to be employed.

It will be understood that in order to optimize the traceability of an object through a long or complex manufacturing pathway, having a number of different process stages, the thermal signature should be such that it remains visible to thermal detectors distributed throughout the pathway. Prior to applying a thermal signature, in embodiments, a specification of a manufacturing process is obtained, from which a thermal signature is configured which can be isolated from the 'background temperature' of unmarked regions of the object for the duration of the manufacturing process, or at least the duration of the portion of the process over which the object is to be tracked.

The specification may thus include a number of different parameters characterizing objects' progression, such as expected movement speeds, and temperatures to be applied to the objects through various process stages (such as heating or cooling stages, or other processes with which a heating or cooling effect may be expected to result). The specification enables a thermal profile of the manufacturing process to be derived, from which the variance of expected temperature of an object with time and position can be predicted. In embodiments, the specification may further include additional information characterizing specific regions of interest of a manufacturing process, in terms of an expected positions at which separation of groups of products from each other into different branches of the process flow are expected, and or expected process bottlenecks or regions of turbulence.

FIG. 1 shows a representative information flow 70 from the spray-painting system 14 to the heat source 20 to show the configuration of the heat source 20 based on process parameters associated with the spray-painting system and the conveyor belt 12 which carries discs 10 through it, but the overall process specification may be derived from an external controller (not shown) or downloaded from a remote computer or server to a controller or driver of the heat source 20.

In embodiments, the thermal signature exceeds the maximum temperature defined by the process specification by a predetermined margin of 'delta' temperature, to allow for in-practice deviations from the expected temperature of particular objects, and/or to account for faster than predicted dissipation of heat from the thermal signature. The stability of the thermal gradient of the thermal signature, once applied to the product, is dependent both on the size of the thermal signature itself (size and starting temperature), and on the nature of the object, in terms of surface are to volume ratio, and material, which affects its heat absorption characteristics. From this information, it is possible to project how quickly a thermal signature will cool after it is applied, in order to compare the projected cooling rate with the process specification. The mechanism by which the thermal signature is created also affects the thermal gradient. For example, some heat sources apply high-intensity heating to the surface of a product, whereas other sources apply a more gradual heat to heat a product to a greater depth. For long manufacturing processes, it may be that larger coverage areas are more suitable since a portion of the coverage area (such as a central area) may retain the required temperature of the thermal signature for longer than peripheral areas.

By way of example, for silicone objects passing through a relatively low-intensity manufacturing process (from the perspective of heating stages applied to the objects) a thermal signature representing heating of the coverage area(s) of an object to 15K greater than the rest of the object may expect to have a detectable life of 1-2 minutes. If the thermal signature represents a 60K increase in temperature, rather than 15K, the thermal signature may be detectable for 3-4 minutes.

The object material is also to be considered when determining an upper bound of the temperature of a thermal gradient to be applied. If an excessively high temperature is used, an object may become damaged or deformed, and so it is desirable to ensure that the thermal signature is of as low a temperature as possible to ensure detectability over the duration of the manufacturing process. This also ensures that embodiments are as efficient as possible in terms of their use of heating resources.

It will be understood that the embodiments illustrated above show examples only for the purposes of illustration. In practice, many modifications to the illustrated embodiments are possible. The modifications take into account the nature of the manufacturing process through which progression is to be tracked, the nature and number of the products which pass through the manufacturing process, and the level of resolution of the detection which is required, in terms of the information needed, and the number of times the information needs to be measured.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method of recording tracking information on an object, for tracking progress of the object through a manufacturing process, the method comprising:
    obtaining one or more temperature specifications associated with the manufacturing process; and
    applying a thermal signature to the object representing the tracking information,
    wherein the thermal signature includes one or more coverage areas having a temperature that is greater than the one or more temperature specifications associated with the manufacturing process.

2. The method of claim 1 wherein the temperature of the thermal signature is greater than a maximum temperature specification of the manufacturing process by at least a predetermined delta temperature.

3. The method of claim 2 wherein the temperature of the thermal signature has a temperature gradient such that it exceeds the maximum temperature specification of the manufacturing process for a time period, following application of the thermal signature, within which the manufacturing process is to be completed.

4. The method of claim 3 wherein applying the thermal signature includes applying heating to each of one or more surfaces of the object using a direct contact, or contactless, heat source.

5. The method of claim 4 wherein the heat source is selected in accordance with at least one of geometry or heat absorption characteristics of at least one of the object or the information to be recorded.

6. The method of claim 5 wherein the heat source is a laser having a wavelength selected in dependence upon a wavelength-absorption characteristics for the object.

7. The method of claim 5 wherein the recorded information includes object identification information.

8. The method of claim 7 wherein:
    the object identification information is a binary string,
    each of a plurality of locations on the object is associated with a digit of the binary string, and
    a coverage area of the thermal signature located at one of the plurality of locations on the object represents a binary state of a respective digit of the binary string.

9. The method of claim 1 wherein:
    the object is an automotive part, and
    the manufacturing process is an automotive manufacturing process.

10. A method of tracking an object travelling through a manufacturing process pathway, the method comprising:
    thermally imaging, at one or more positions along the manufacturing process pathway, a thermal signature located on the object to identify one or more areas of the object having a temperature greater than a threshold temperature;
    determining object information based on the identified one or more areas; and recording progress, along the manufacturing process pathway, of the object having a determined object identification.

11. A method of tracking an object through a manufacturing process, the method comprising:
   obtaining one or more temperature specifications associated with the manufacturing process;
   at a first position along the manufacturing process, applying a thermal signature to the object representing tracking information, wherein the thermal signature includes one or more coverage areas having a temperature that is greater than the one or more temperature specifications associated with the manufacturing process;
   at a second position along the manufacturing process, thermally imaging a thermal signature located on the object to identify one or more areas of the object having a temperature greater than a threshold temperature;
   determining object information based on the identified one or more areas; and
   recording progress, along the manufacturing process, of the object having a determined object identification.

\* \* \* \* \*